United States Patent
Harvey

[11] 3,776,610
[45] Dec. 4, 1973

[54] SERVO MOTORS
[75] Inventor: Dennis Francis Harvey, Birmingham, England
[73] Assignee: Girling Limited, Birmingham, England
[22] Filed: July 26, 1971
[21] Appl. No.: 165,907

[30] Foreign Application Priority Data
Aug. 6, 1970 Great Britain................... 37,952/70

[52] U.S. Cl.................... 308/3.5, 277/36, 277/37, 308/36.1
[51] Int. Cl. ............................................. F16c 33/74
[58] Field of Search........................... 308/36.1, 3.5; 277/35, 36, 37, 39; 92/165, 128

[56] References Cited
UNITED STATES PATENTS
3,104,916  9/1963  Dowling et al...................... 308/3.5
3,388,635  6/1968  Hager................................. 92/165 R
1,664,218  3/1928  Lang.................................. 308/36.1
2,757,988  8/1956  Lecourbe........................... 308/36.1
2,981,573  4/1961  Reuter............................... 308/36.1

*Primary Examiner*—Charles J. Myhre
*Assistant Examiner*—Barry Grossman
*Attorney*—Scrivener, Parker et al.

[57] ABSTRACT

A housing for servo motors for vehicle braking systems is disclosed having an easily fabricated housing member in the end wall of the housing for carrying output rod sealing means. The housing member has an annular lip which cooperates with an annular lip on the end wall of the housing and forms a location therebetween to house a second seal.

5 Claims, 2 Drawing Figures

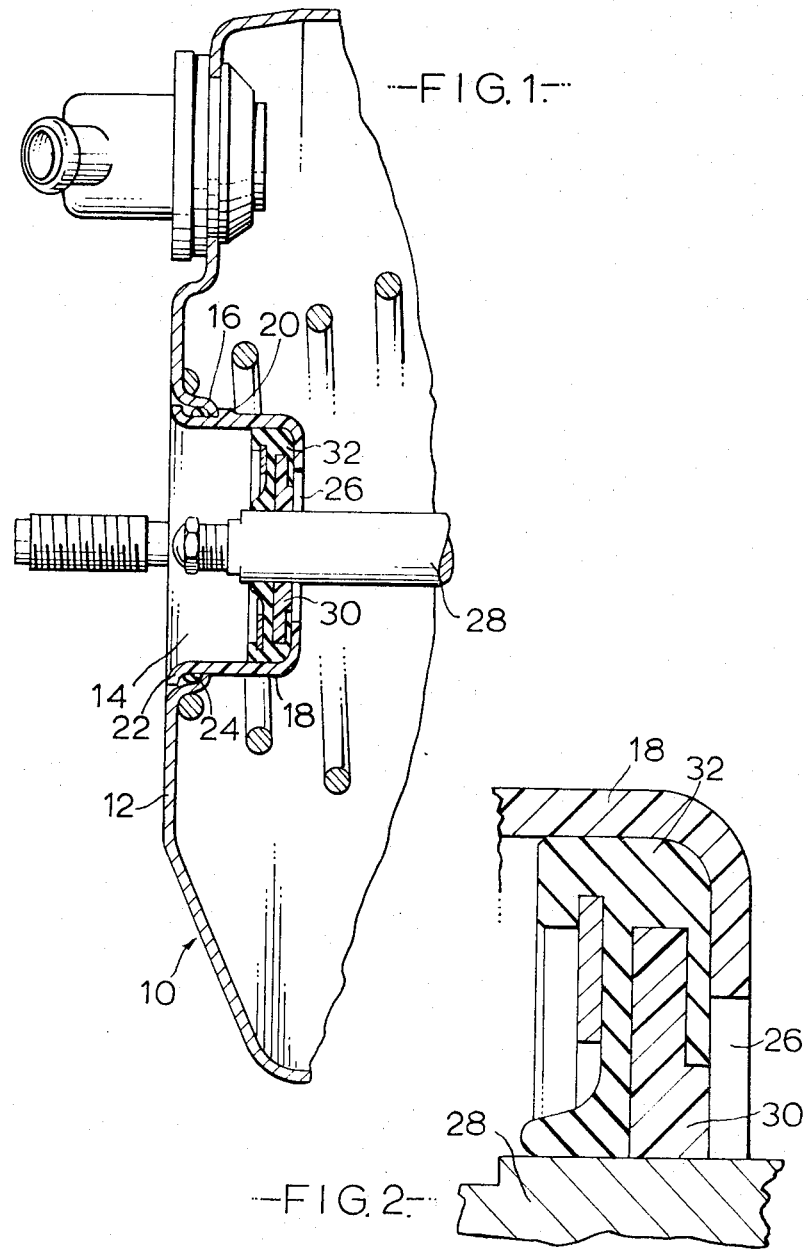

SERVO MOTORS

This invention relates to servo motors and in particular relates to a sealing arrangement for use in a servo motor such as that described in our copending British Pat. application No. 44179/69.

In the servo motor disclosed in copending British Pat. application No. 44179/69 the output rod of the servo motor passes through a seal/bearing arrangement held in an axial recess formed in one end of the housing of the servo motor. To form the axial recess the housing must be deformed. The process for deforming the housing is expensive and the deformed cup-shaped recess is susceptible to cracks occurring in bends where the pressed metal can, if not properly controlled, become very thin. The conventional remedy for this phenomenon has been to use thicker metal which, of course, is more expensive.

According to the present invention therefore there is provided a housing for a servo motor which comprises an end wall having an aperture therein, which aperture has a first face, and a housing member adapted to contain a first seal and having a second face so formed that it cooperates with the first face of the end wall to form a location therebetween to house a second sealing member when the housing member is mechanically coupled to the end wall.

The first and second faces are advantageously cooperating annular lips.

Preferably, the housing member is fabricated from a plastics material by a method such as moulding.

The invention will be described further, by way of example, with reference to the accompanying drawings, in which:

FIG. 1 is a sectional view of part of a servo motor embodying the housing of the invention; and FIG. 2 is a detail view of part of FIG. 1.

Referring to the drawings, a housing generally designated 10 comprises an end wall 12 having a circular aperture 14 therein. The aperture 14 has an axially directed flange terminating in a generally radially directed rim together comprising a lip 16. A generally cup-shaped housing member 18 made from a suitable plastics material is push-fitted into the aperture 14 where it is retained by means of a number of projections 20 spaced about the member 18, contacting the rim 16. The cup-shaped member 18 has a radially outwardly directed flange 22 which cooperates with the lip 16 of the aperture 14. An annular sealing member 24 is trapped between the lip 16 and the flange 22 when the cup-shaped member 18 is in position. The sealing member 24 is under both radial and axial compression and therefore provides an air-tight seal. The member 18 has a centrally located circular aperture 26 through which passes an output rod 28. Loose axial alignment of the output rod 28 within the housing 10 is achieved by a radial phenolic resin bearing member 30. The bearing member 30 is carried in a radial recess of a fluid seal 32 which is located in the cup-shaped member 18. The fluid seal 32 bears in fluid sealing engagement at its outer periphery on the inner wall of the member 18 and at its inner periphery similarly engages the output rod 28.

To fit the cup-shaped member 18 into the housing 10 the deformable seal 24 is first placed in position on the cup-shaped member 18. The member 18 is then pushed into the aperture 14 of the end wall 12 until the projections 20 engage behind the lip 16, in which position the seal 24 is deformed and the member 18 is held tightly in position. The seal 32 and bearing member 30 serve to loosely axially align the output rod 28 and seal off the chamber whilst the rod moves relative to the housing.

Although the invention is particularly useful in conjunction with tandem brake boosters, such as that described in our copending British Pat. application No. 44179/69, it will be appreciated that the invention is also applicable to single boosters.

I claim:

1. Means for loosely and sealingly guiding an axially movable output rod in substantial alignment with an aperture in the end wall of a servo motor housing comprising a separate housing member located in said aperture, a sealing member in said housing member having an outer periphery sealingly engaging said housing member and an inner periphery adapted to sealingly and slideably engage said rod, a bearing member carried by said sealing member and having a central opening adapted to slideably receive said rod, a first face on the end wall of the housing surrounding said aperture, a second face on said housing member which in cooperation with said first face defines a seal carrying location, a second seal located within said seal carrying location, and means mechanically coupling said housing member to said housing.

2. A means according to claim 1 wherein said first and said second face each comprise an annular lip.

3. A housing according to claim 1 wherein said housing member is fabricated from a plastics material.

4. Means as in claim 1 wherein said mechanical coupling means comprises projections on said housing member which locate behind said lip on the housing to retain the housing member in place in the housing.

5. A means according to claim 4 wherein said projections are so located that said second seal is held under compression when the member is in place in the housing.

* * * * *